United States Patent Office
3,431,091
Patented Mar. 4, 1969

3,431,091
WIRES FOR ARC WELDING HAVING A LOW CARBON CORE AND A ZINC COATING
Pierre Soulary, Croissy-sur-Seine, France, assignor to L'Air Liquide, Societe Anonyme pour l'Etude et l'Exploitation des Procedes Georges Claude
No Drawing. Filed Mar. 2, 1966, Ser. No. 531,062
Claims priority, application France, Mar. 18, 1965, 9,677
U.S. Cl. 29—183.5      3 Claims
Int. Cl. C01f 7/00; C01b 31/30, 33/06

ABSTRACT OF THE DISCLOSURE

A steel wire for gas-shielded electric arc welding consists essentially of about 0.1% by weight of carbon, 0.1–0.25% by weight of aluminum, 0.4–0.6% by weight of silicon, 0.5–2% by weight of manganese, balance essentially iron, and a coating of metallic zinc on the wire in the quantity 0.04–0.5% by weight of the wire and having a thickness greater than 0.1 micron. Thus, the disadvantages of high zinc or high aluminum are avoided, despite the use of low silicon, by using small quantities both of zinc and of aluminum.

---

The present invention relates to wires which can be used as continuous electrodes in the automatic or semi-automatic arc welding with a fusible electrode and in a gaseous atmosphere of mild or low-alloy steels.

These wires can also be used as supply metal in the electric arc welding processes under gaseous atmosphere with refractory or infusible electrodes.

For the electric welding in a gaseous atmosphere of mild or low-alloy steels, particularly for arc welding under argon, helium, hydrogen, carbon dioxide, oxygen or mixtures of these gases, it is customary to employ welding wires consisting of steel with a low content of carbon, silicon and manganese. These wires can possibly contain other metallic additions such as: titanium, molybdenum, chromium, nickel, vanadium, etc., the purpose of which is to deoxidise the welding bath and particularly to improve the mechanical characteristics of the welds in which they participate.

The content of silicon, the deoxidising element universally employed in siderurgy of these wires is usually between 0.4 and 1.4%. These are contents which would be abnormally high for ordinary constructional steels, but which are accepted in wires for arc welding in a gaseous atmosphere, because it is then necessary to avoid the porosities caused by the gases occluded in the steels and the atmospheric contamination of the fusion zone.

The silicon of the wires is partially found in the weld beads and thereby weakens the mechanical characteristics. Another consequence thereof is to increase the fluidity of the molten steel and this quite generally reduces the possibilities of welding in position and leads to a less satisfactory utilisation of the possibilities of welding in a gaseous flux with normal electrical operation which provides alternations of short-circuits and short-arcs. For these two reasons, it is desirable for the silicon content of the weld bead to remain less than 0.5%.

The present invention is concerned with wires for arc welding in a gaseous atmosphere and of which the silicon content is small with a view to reducing the harmful influence of this constituent as regards the mechanical characteristics of the weld beads which are obtained and as regards the fluidity of the welding baths.

The steel wires for welding in a gaseous atmosphere and forming the subject of the invention are characterised in that the steel which forms them is covered with a layer of zinc in the solid state and contains a certain content of aluminum in addition to the usual deoxidising elements, the zinc and the aluminum making it possible, despite a reduced silicon content, to obtain a sufficient deoxidation of the molten bath or pool and to reduce the loss of silicon during the welding operation.

As well as the silicon, the aluminum and the superficial zinc, these wires can of course contain other elements which are unavoidable, essential or useful with regard to the elaboration of the steel and the mechanical qualities required in the weld bead, such as carbon, manganese, titanium, chromium, nickel, vanadium, etc.

It is to be pointed out that the loss of these elements during the welding, which loss is mainly caused by oxidation, is reduced by the presence of aluminum and zinc in and on the wire. This loss is strictly related, as is also the loss of aluminum included in the wire, to the welding conditions and to the nature of the protective gas which, at the temperature of the welding arc, can be more or less oxidising, depending on its composition.

The wires according to the invention are covered with a zinc layer which has a thickness corresponding to a linear charge of 0.04% to 0.5% of the weight of the steel and preferably from 0.08 to 0.14%, this thickness being however always greater than 0.1 micron. This coating can be obtained by the process for the treatment of steel wire surfaces, as described in French Patent No. 1,342,173 of Aug. 9, 1962.

The aluminum content of these wires is greater than 0.02% and may reach 1%. The silicon content is of the order of 0.4% to 0.6%; it is thus decidedly smaller than the contents usually accepted for welding wires in a gaseous atmosphere. The manganese content is at most equal to that which would be chosen, under equivalent conditions of use, for wires not having a zinc coating and not containing aluminum. It is between 0.5 and 2%.

It has been observed that a zinc-coated wire according to the invention, containing 0.10 to 0.25% of aluminum, gave beads or fillets of good density when the silicon content was 0.4%.

In the present case, the zinc is not only used as an anti-corrosion covering. Zinc has a high reducing power in the vapour state and the external zinc layer, of which the vaporisation temperature is below 1000° C., produces vapours which impart or completely fix the free or combined oxygen of the gases which are in contact with the arc and with the welding bath.

In addition, as is known, the deposition of zinc on the steel wire intended for the welding operation makes the welding arc in a gaseous atmosphere more stable and improves the distribution of the slags produced by the oxides of the elements contained in the steel, particularly silicon, manganese and aluminum. Finally, the zinc is not present in a percentage sufficient to make the welds which are obtained fragile, nor for producing fumes which would be disagreeable to the welder.

As already mentioned, the aluminum included in the wire has the effect of participating in the desoxidation of the welding bath and it also has the effect of increasing the viscosity thereof, and this can facilitate the work of welding in position.

With the content of 0.1% by weight in the wire, and if the welding is carried out under a pure $CO_2$ atmosphere, the aluminum makes it possible to reduce the contents of silicon and manganese of the wire by 0.1 to 0.2% with respect to those which they would have to be in order to obtain a weld bead or fillet having the same contents of these elements with a wire not containing aluminum; by working in an argon atmosphere mixed with 3% of oxygen, the effect of the aluminum is less pronounced: a content of 0.1% of aluminum can nevertheless enable the silicon content of the wire to be reduced by 0.1%.

The quantity of aluminum which is found in the metal of the weld bead or fillet obviously depends on the aluminum content of the wire, but it is also very greatly influenced by the more or less oxidising character of the protective gas, by the welding conditions and by the normal dynamic operation of the arc. It is found in practice that the residual aluminum content in the weld fillet remains between a tenth and a third of the content of aluminum of the zinc-coated wire.

Starting from a content of 0.02%, the aluminum has a marked effect on the viscosity of the molten steel. After solidification and cooling, the steel has practically the same mechanical characteristics as if it did not contain aluminum. For higher contents, the viscosity is increased, but the resilience falls progressively and the characteristics of resistance to breaking are very seriously impaired by the presence in the weld fillet of aluminum contents higher than 0.05%.

The result of the foregoing is that the wires according to the invention will have, in addition to their zinc coating, aluminum contents which are lower than or equal to 0.25%, where it is a question of carrying out normal constructional work, and contents which may be up to 1% in the particular cases where, welding in a very oxidising atmosphere, it is desired to have a high viscosity for the welding bath without being particularly concerned with the resilience of the assemblies.

For quality welding operations, carried out in the flat state, at high intensity and with a stable operation of the arc, the optimum aluminum contents in the zinc-coated wires according to the invention could thus be in the region of 0.25% when welding with decidedly oxidising gases, such as pure $CO_2$, and in the region of 0.1% when welding under gases which are not very oxidising, such as mixture of argon with 3% of oxygen. In actual fact, these optimum contents are not critical and the same wire according to the invention may be found to be very advantageous with the various gases which are based on $CO_2$, argon, helium and oxygen of conventional use when welding mild or low-alloy steels.

Example 1

The wire in question is a steel wire surface-coated with zinc and having the following chemical composition:

| | Percent |
|---|---|
| Carbon | 0.1 |
| Silicon | 0.5 |
| Manganese | 1.2 |
| Aluminum | 0.1 |
| Surface zinc | 0.1 |

A wire of this composition and with a diameter equal to 16/10 mm. used with a welding current of the order of 400 amp., enables weld beads to be obtained which have the chemical composition by welding in a $CO_2$ atmosphere:

| | Percent |
|---|---|
| Carbon | 0.08 |
| Silicon | 0.25 |
| Manganese | 0.9 |
| Aluminum | 0.02 |
| Zinc | Traces | and by welding in a gaseous mixture of argon with 3% of oxygen:

| | Percent |
|---|---|
| Carbon | 0.09 |
| Silicon | 0.35 |
| Manganese | 1.1 |
| Aluminum | 0.02 |
| Zinc | Traces |

If it were desired, when starting with a wire which is not zinc-coated and is not charged with aluminum, to obtain, except for the aluminum, the same chemical composition in the weld bead, it would be necessary to make this wire with a steel having approximately the following chemical composition:

| | Percent |
|---|---|
| Carbon | 0.12 |
| Silicon | 0.8 |
| Manganese | 1.6 |

Such a steel would be more difficult to work and to draw, it would present more marked cold-drawn effects and would be more fluid in the liquid state than the steel of the wire according to the invention.

Example 2

A wire of the following composition:

| | Percent |
|---|---|
| Carbon | 0.080 |
| Silicon | 0.055 |
| Manganese | 1.50 |
| Aluminum | 0.20 |
| Surface zinc | 0.1 | used in a diameter of 1.2 mm. in a carbon dioxide atmosphere gave, when used with a welding current of 280 amp beads with the following composition:

| | Percent |
|---|---|
| Carbon | 0.054 |
| Silicon | 0.23 |
| Manganese | 0.80 |
| Aluminum | 0.035 | to which corespond the following mechanical characteristics:

| | | |
|---|---|---|
| R (tensile strength) | h. bar | 47 |
| E (elastic limit) | h. bar | 37 |
| Kv (Charpy notch impact strength) | da. J/cm.$^2$ | 5 | used with a welding current of 140 amps, weld beads are obtained with the following composition:

| | Percent |
|---|---|
| Carbon | 0.07 |
| Silicon | 0.30 |
| Manganese | 0.85 |
| Aluminum | 0.3535 |

With equality of carbon, silicon and manganese contents, the bead obtained from wire coated with zinc and charged with aluminum is better deoxidised and free with greater certainty from porosities than the bead obtained with the ordinary wire.

What I claim is:

1. A steel wire for gas-shielded electric arc welding consisting essentially of about 0.1% by weight of carbon, 0.1–0.25% by weight of aluminum, 0.4–0.6% by weight of silicon, 0.5–2% by weight of manganese, balance essentially iron, and a coating of metallic zinc on the wire in the quantity 0.04–0.5% by weight of the wire and having a thickness greater than 0.1 micron.

2. A welding wire as claimed in claim 1, in which the zinc is 0.08–0.14% by weight.

3. A welding wire as claimed in claim 1, in which the aluminum is about 0.1% by weight, the silicon is about 0.5% by weight, the manganese is about 1.2% by weight, and the surface zinc is about 0.1% by weight.

References Cited

UNITED STATES PATENTS

| | | | |
|---|---|---|---|
| 3,088,196 | 5/1963 | Tour. | |
| 3,142,116 | 7/1964 | Morita. | |
| 3,149,928 | 9/1964 | Schrader | 29—196.5 |
| 3,177,053 | 4/1965 | Lusa | 29—196.5 |
| 3,190,768 | 6/1965 | Wright | 29—196.5 XR |
| 3,231,712 | 1/1966 | Koopman. | |

HYLAND BIZOT, *Primary Examiner.*

U.S. Cl. X.R.

29—196.5